(12) United States Patent
Sato et al.

(10) Patent No.: US 7,722,500 B2
(45) Date of Patent: May 25, 2010

(54) CONTROL DEVICE AND CONTROL METHOD FOR AUTOMATIC TRANSMISSION

(75) Inventors: Toshimitsu Sato, Toyota (JP); Hiromichi Kimura, Okazaki (JP); Kentarou Okada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 556 days.

(21) Appl. No.: 11/565,882

(22) Filed: Dec. 1, 2006

(65) Prior Publication Data

US 2007/0149356 A1 Jun. 28, 2007

(30) Foreign Application Priority Data

Dec. 22, 2005 (JP) .............................. 2005-369729

(51) Int. Cl.
*B60W 10/02* (2006.01)
(52) U.S. Cl. .................. 477/174; 477/115; 477/156; 477/906
(58) Field of Classification Search ......... 477/115–117, 477/125, 158, 162, 163, 906, 98, 156, 159, 477/174, 175, 168, 169, 180, 7–72; 475/132, 475/133, 116–118, 120, 127
See application file for complete search history.

(56) References Cited

U.S. PATENT DOCUMENTS

| | | | | |
|---|---|---|---|---|
| 4,843,909 A | * | 7/1989 | Hasegawa et al. ........... 475/119 |
| 5,307,727 A | * | 5/1994 | Berger et al. .................... 91/29 |
| 5,788,040 A | * | 8/1998 | Moorman et al. ........ 192/103 C |
| 5,813,943 A | * | 9/1998 | Kousaka et al. ............. 477/156 |
| 6,248,042 B1 | * | 6/2001 | Lee ............................ 477/155 |
| 6,790,160 B2 | * | 9/2004 | Kato et al. ................... 477/154 |
| 7,331,902 B2 | * | 2/2008 | Runde ......................... 477/117 |

FOREIGN PATENT DOCUMENTS

| | | |
|---|---|---|
| AP | 2000-179661 | 6/2000 |
| JP | 02-051658 | 2/1990 |
| JP | 03-219164 | 9/1991 |
| JP | 5-306763 | 11/1993 |

* cited by examiner

*Primary Examiner*—Roger L Pang
*Assistant Examiner*—Justin Holmes
(74) *Attorney, Agent, or Firm*—Oblon, Spivak, McClelland, Maier & Neustadt, L.L.P.

(57) ABSTRACT

When an N position sensor is ON, even though the N position is selected, the oil pressure supplied to a clutch C1 which is engaged during the transition from the non-running state to the running state is raised in advance to a predetermined oil pressure; and, if a running request is detected when a D position decision has not been made, irrespective of whether or not a shift lever has been shifted from its N position to its D position, first speed starting off from rest control is performed, in which the oil pressure supplied to the clutch C1 is raised to an oil pressure at which the clutch C1 is capable of power transmission.

15 Claims, 7 Drawing Sheets

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

○ ENGAGED
× RELEASED
◎ ENGAGED DURING ENGINE BREAKING
△ ONLY ENGAGED DURING DRIVE

CONTROL DEVICE AND CONTROL METHOD FOR AUTOMATIC TRANSMISSION

INCORPORATION BY REFERENCE

The disclosure of Japanese Patent Application No. 2005-369729 filed on Dec. 22, 2005 including the specification, drawings and abstract is incorporated herein by reference in its entirety.

BACKGROUND OF THE INVENTION

1. Field of the Invention

The present invention relates to a control device and a control method for an automatic transmission, and in particular relates to a control device and a control method for an automatic transmission, which are effective with regard to failure countermeasures during garage shifting.

2. Description of the Related Art

Among types of automatic transmission mounted to a vehicle, there is a stepped type of automatic transmission which comprises a fluid coupling such as a torque converter or the like and a planetary gear type speed reduction device; and also there is a stepless type of automatic transmission which comprises a metallic belt wound between two pulleys whose effective diameters can be changed by oil pressure.

A stepped type automatic transmission is connected to the engine via a fluid coupling such as a torque converter or the like. Such a stepped type of automatic transmission comprises a transmission construction (a planetary gear type speed reduction device construction) which provides a plurality of power transmission paths, and, for example, changes over between these power transmission paths automatically based upon the accelerator opening amount and the vehicle speed; in other words, it is built so as to perform changeover between its various speed change ratios (running speed ranges) automatically. With this stepped type of automatic transmission, the engaged gear stage is determined by engaging and releasing predetermined combinations of clutch elements and brake elements (which are friction elements) and one way clutch elements.

On the other hand, a stepless type automatic transmission is also connected to the engine via a fluid coupling such as a torque converter or the like. For example, a belt type stepless transmission employs a metallic belt and a pair of pulleys, and implements continuous stepless speed changing by varying the effective diameters of these pulleys by oil pressure actuation. In more detail, this endless metallic belt is passed around an input side pulley, which is fixed to an input shaft, and an output side pulley, which is fixed to an output shaft. This input side pulley and output side pulley each comprises a pair of sheaves the width of the groove between with can be changed in a stepless manner, and, by thus changing the groove widths of the pulleys, the radiuses of the portions of the endless metallic belt which pass around the input side pulley and the output side pulley change, so that the rotational speed ratio between the input side pulley and the output side pulley, in other words the speed change ratio, can be changed continuously and steplessly.

With either of these types of automatic transmission, generally, a shift lever is provided to the vehicle in which the automatic transmission is fitted, this shift lever being actuated by the driver of the vehicle; and speed range positions (for example a reverse running position, a neutral position, and one or more forward running positions) are set based upon actuation of this shift lever.

In order to take a vehicle to which an automatic transmission having this type of structure is mounted out of its garage before driving the vehicle upon the road, or in order to put the vehicle back into the garage after driving the vehicle upon the road, or the like, so called garage shifting is performed, in which the shift lever is shifted from the parking (P) position to the reverse running (R) position in order to drive the vehicle backwards, or from the neutral (N) position to the forward running (D) position or to the reverse running (R) position, in order to move the vehicle forwards or backwards respectively.

In consideration of the possibility that the shift position for shift actuation, including such garage shift actuation, may not be accurately detected, for example, in Japanese Patent Application Publication No. JP-5-306763, there is disclosed a shift position decision control device which, when the N position and the L position have been detected at the same time, gives priority to the detection of the L position.

This shift position decision control device is a shift position decision control device of an automatic transmission for a vehicle which includes a shift position detection means which detects the shift position set by a shift actuation mechanism electrically, and a means which operates a friction engaging element for engine braking by changing over an oil conduit within an oil pressure circuit, based upon an electrical detection signal for the shift position; and it includes: a decision means which decides whether or not a non-running position is being detected by the shift position detection means; a decision means which decides whether or not a shift position in which engine braking must be put into effect is detected by the shift position detection means; and an operating means which, when even in the state in which a non-running position is detected, also at the same time a shift position in which engine braking must be put into effect is detected, operates the friction engaging element for engine braking, by giving priority to the detection of the shift position in which engine braking must be put into effect.

With this shift position decision control device for an automatic transmission for a vehicle, even in the state in which a non-running position (the N position) is detected, when at the same time a shift position in which engine braking must be put into effect (the L position) is detected, it is arranged to give priority to the detection of this shift position in which engine braking must be put into effect, and, based upon this detection, the friction engaging element for engine braking is operated. As a result, the implementation of engine braking is not deteriorated.

It is included in the disclosure of the above document that shift operation is detected as a shift position by an electrical signal, and, based thereupon, the gear speed change of the automatic transmission (if it is of a stepped type), or the speed change gear ratio of the automatic transmission (if it is of a stepless type or of a stepless type which incorporates a sequential shift mechanism), is changed.

Now, when a fault occurs in the sensor (the switch) which detects this shift position, the driver is not able to engage the shift range to which he has shifted the shift lever. In particular, there is the possibility that it is not possible to start the vehicle off from rest, if the shift operation from the N position to the D position (garage shifting) cannot be detected.

However, in the above described Japanese Patent Application Publication No. JP-5-306763, no mention is made of this type of problem. Furthermore when, with the shift lever being in its D position, it is detected (erroneously) that the shift lever is still in its N position, when the driver depresses the accelerator pedal and demands that the vehicle should start off from rest, a clutch (for example a clutch C1 for starting off from rest) which is a friction engaging element is abruptly engaged, so that, from the state in which the N position is engaged, abruptly the first speed range is engaged. At this time, since there is an inevitable response delay in a linear solenoid valve, in particular at low temperatures, accordingly there is a possibility that the actual oil pressure may exceed the commanded oil pressure, in which case there is a possibility that the control may become unstable.

SUMMARY OF THE INVENTION

The objective of the present invention is to provide a control device and a control method for an automatic transmission, which are capable of starting off the vehicle rapidly from rest according to a request from the driver, even if the shift position detection sensor is faulty (i.e. has failed).

The control device for an automatic transmission according to a first aspect of the present invention controls an automatic transmission which transits from a non-running state to a running state by a friction engaging element which is operated by oil pressure transiting from a state in which it is released to a state in which it is engaged. And this control device includes: a shift position detection means which detects shift positions, including a first shift position which corresponds to the non-running state and a second shift position which corresponds to the running state, based upon the position of a shift actuation mechanism; and an oil pressure control means which raises the oil pressure supplied to the friction engaging element, when the shift position detection means detected that the shift position is the first shift position.

According to this first aspect of the present invention, in the first shift position (for example the N position) which corresponds to the non-running state, the oil pressure which is supplied to a friction engaging element which, by transiting from a state in which it is released to a state in which it is engaged, causes the automatic transmission to transit from the non-running state to a running state (corresponding, for example, to the D position, which is the second shift position), is elevated in advance. If subsequently, even though the shift actuation mechanism has been actuated from the N position to the D position, it is not possible for the detection means to detect the D position, since the oil pressure which is supplied to the friction engaging element for the transition from the non-running state to the running state is elevated even though the driver is stepping upon the accelerator pedal, and since the oil pressure which is supplied is further elevated in order for the friction engaging element to transit from this elevated state to the engaged state, accordingly, even if for example the temperature of the working oil is low so that the responsiveness is not satisfactory, it is still possible to engage the friction engaging element rapidly in order to start the vehicle off from rest. As a result it is possible to provide a control device for an automatic transmission with which, even if a fault in the shift position detection sensor has occurred, it is still possible to start the vehicle off rapidly from rest.

And, in the control device for an automatic transmission according to a second aspect of the present invention, in addition to the structure of the first aspect as described above, there are further included a running request detection means which detects a running request if, irrespective of whether or not the position of the shift actuation mechanism is a position which corresponds to the second shift position, the detection means cannot detect that the position of the shift actuation mechanism is the second shift position, and a starting control means which, if the running request is detected, raises the oil pressure supplied to the friction engaging element, until the friction engaging element is brought to a power transmission state.

According to this second aspect of the present invention, in the first shift position (for example the N position), the oil pressure which is supplied to the friction engaging element for transition to the running state is kept elevated. When thereafter, even though the shift actuation mechanism is actuated from the N position to the D position, it is not possible for the detection means to detect the D position, then, even though the driver is stepping upon the accelerator pedal, the oil pressure which is supplied to the friction engaging element which is engaged for the transition from the non-running state to the running state is elevated. From this state, the oil pressure which is supplied is elevated so as to bring about an engaged state in which the friction engaging element is able to transmit power. Due to this, even if for example the temperature of the working oil is low so that the responsiveness is not satisfactory, it is still possible to engage the friction engaging element rapidly in order to start the vehicle off from rest.

And, in the control device for an automatic transmission according to a third aspect of the present invention, in addition to the structure of the first aspect as described above, there are further included a running request detection means which detects a running request if, irrespective of whether or not the position of the shift actuation mechanism is a position which corresponds to the second shift position, the shift position detection means detects that the position of the shift actuation mechanism is the first shift position, and a starting control means which, if a running request is detected, raises the oil pressure supplied to the friction engaging element, until the friction engaging element is brought to a power transmission state.

According to this third aspect of the present invention, in the first shift position (for example the N position), the oil pressure which is supplied to the friction engaging element for transition to the running state is kept elevated. When thereafter, even though the shift actuation mechanism is actuated from the N position to the D position, the detection means keeps on detecting the N position, then, even though the driver is stepping upon the accelerator pedal, the oil pressure which is supplied to the friction engaging element which is engaged for the transition from the non-running state to the running state is elevated. From this state, the oil pressure which is supplied is elevated so as to bring about an engaged state in which the friction engaging element is able to transmit power. Due to this, even if for example the temperature of the working oil is low so that the responsiveness is not satisfactory, it is still possible to engage the friction engaging element rapidly in order to start the vehicle off from rest.

And, in the control device for an automatic transmission according to a fourth aspect of the present invention, in addition to the structure of the second aspect or the third aspect as described above, there are further included a means which detects the output shaft rotational speed of the automatic transmission, and a means which raises the oil pressure supplied to the friction engaging element to maximum, if the running request is detected, and if based upon the output shaft rotational speed it is decided that the vehicle is running.

According to this fourth aspect of the present invention, by bringing the oil pressure supplied to the friction engaging element to a maximum after the vehicle is running, it is possible to notify the occurrence of an anomaly to the driver.

And, in the control device for an automatic transmission according to a third aspect of the present invention, in addition to the structure of the fourth aspect as described above, there is further included a means which detects the temperature of the working oil of the automatic transmission. And there is included a means which raises the oil pressure supplied to the friction engaging element, if the temperature of the working oil is lower than a predetermined temperature.

According to this fifth aspect of the present invention, even if the responsiveness is bad since the temperature of the working oil of the automatic transmission is low and accordingly the viscosity of the working oil is high so that its fluidity is not satisfactory, it is nevertheless still possible to respond rapidly to a request from the driver to start the vehicle off from rest, even if the detection means is faulty.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Embodiments of the present invention will now be explained with reference to the drawings. In the following explanation, to components which are the same, the same reference symbols are affixed. Moreover, their names and functions are also the same. Accordingly, detailed explanation thereof will not be repeated.

Figure 1:
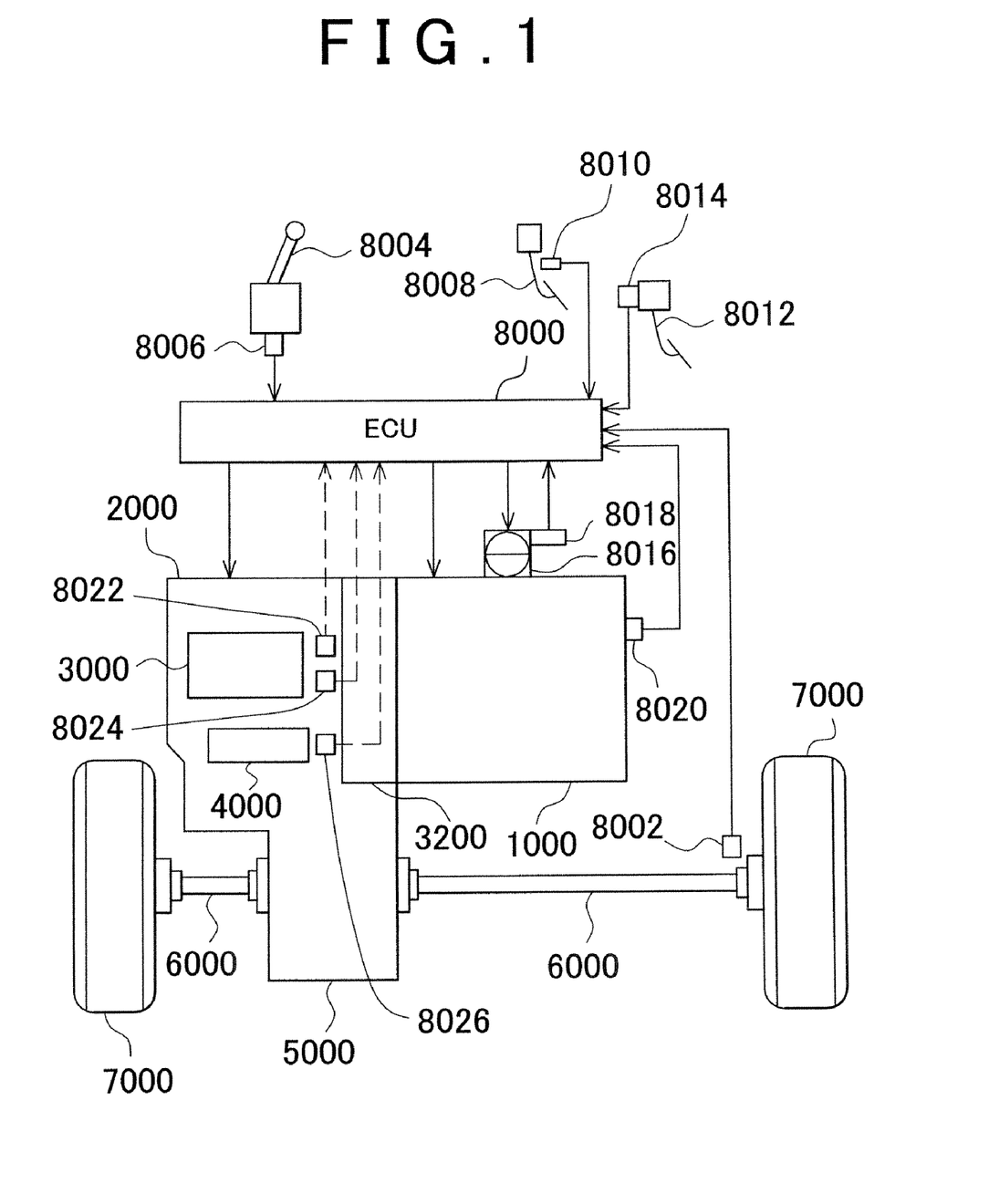
FIG. 1 is a general structural figure showing a power train controlled by an ECU which is a control device according to an embodiment of the present invention.

Referring to FIG. 1, a vehicle will be explained to which a control device according to an embodiment of the present invention is mounted. This vehicle is a FF (Front engine Front drive) vehicle. It should however be understood that the present invention could also be applied to some other type of vehicle than an FF vehicle.

This vehicle comprises an engine 1000, an automatic transmission 2000, a planetary gear unit 3000 which constitutes one part of the automatic transmission 2000, an oil pressure circuit 4000 which also constitutes one part of the automatic transmission 2000, a differential gear 5000, drive shafts 6000, front wheels 7000, and an ECU (Electronic Control Unit) 8000.

The engine 1000 is an internal combustion engine which combusts, in combustion chambers of its cylinders, a mixture of fuel injected from injectors (not shown in the figure) and air. Pistons are pressed downwards in these cylinders due to this combustion, so that a crank shaft is rotated.

The automatic transmission 2000 is connected to the engine 1000 via a torque converter 3200. This automatic transmission 2000 changes the rotational speed of the crank shaft to a desired rotational speed by engaging a desired gear stage. It should be understood that, instead of this automatic transmission which engages successive gear stages, it would also be acceptable to mount to this vehicle a CVT (Continuously Variable Transmission) which changes its speed change ratio steplessly. Such a CVT is provided with a starting off from rest clutch C1 which, during garage shifting (transition from the N position to the D position), is engaged so as to engage a first speed range. Moreover, this automatic transmission may be one which includes such a starting off from rest clutch C1 and which also includes constantly meshed type gear wheels, with its speed range being changed by oil pressure actuators.

The output gear of this automatic transmission 2000 is meshed with the differential gear 5000. The drive shafts 6000 are fitted to the differential gear 5000 by fitting with splines or the like. Power is supplied to the left and right front wheels 7000 via these drive shafts 6000.

To the ECU 8000, there are connected via a wiring harness or the like: a vehicle speed sensor 8002, a position switch 8006 of a shift lever 8004, an accelerator opening amount sensor 8010 of an accelerator pedal 8008, a stroke sensor 8014 of a brake pedal 8012, a throttle opening amount sensor 8018 of an electronic throttle valve 8016, an engine rotational speed sensor 8020, an input shaft rotational speed sensor 8022, an output shaft rotational speed sensor 8024, and an oil temperature sensor 8026.

The vehicle speed sensor 8002 detects the speed of the vehicle from the rotational speed of the drive shaft 6000, and transmits a signal which specifies the result of this detection to the ECU 8000. And the position of the shift lever 8004 is detected by the position switch 8006, which transmits a signal which specifies the result of this detection to the ECU 8000. A gear stage of the automatic transmission 2000 which corresponds to the position of the shift lever 8004 detected in this manner is established automatically. Furthermore, it would also be acceptable to arrange to make it possible, according to actuation by the driver, for him to select a manual shift mode in which he can select any speed range which he desires.

At this time, when the shift lever 8004 is positioned to an N position, a signal is sent from the position switch 8006 to the ECU 8000 to the effect that a N position sensor is ON, while, when the shift lever 8004 is positioned to a D position, a signal is sent to the effect that a D position sensor is ON. If the position switch 8006 is functioning normally, during garage shifting (i.e. when the shift lever 8004 is shifted from the N position to the D position), the ECU 8000 is able to detect that the state has changed from a state in which the N position sensor is ON to a state in which the D position sensor is ON.

However, if the N position sensor has gone short circuit, then this N position sensor remains ON just as it is, even when the shift lever 8004 is positioned to the D position. Furthermore, if the D position sensor has become disconnected, then the D position sensor remains OFF just as it is, even when the shift lever 8004 is positioned to the D position.

The accelerator opening amount sensor 8010 detects the opening amount of the accelerator pedal 8008, and transmits a signal which specifies the result of this detection to the ECU 8000. And the stroke sensor 8014 detects the stroke amount of the brake pedal 8012, and transmits a signal which specifies the result of this detection to the ECU 8000.

The throttle opening amount sensor 8018 detects the opening amount of the electronic throttle valve 8016, whose opening amount is adjusted by an actuator, and transmits a signal which specifies the result of this detection to the ECU 8000.

The amount of air which is inhaled by the engine 1000 (i.e. the output of the engine 1000) is adjusted by this electronic throttle valve 8016.

The engine rotational speed sensor 8020 detects the rotational speed of the output shaft (i.e. of the crank shaft) of the engine 1000, and transmits a signal which specifies the result of this detection to the ECU 8000. And the input shaft rotational speed sensor 802 detects the rotational speed NI of an input shaft of the automatic transmission 2000 (i.e. the rotational speed of the turbine of the torque converter 3200), and transmits a signal which specifies the result of this detection to the ECU 8000. And the output shaft rotational speed sensor 8024 detects the rotational speed NO of an output shaft of the automatic transmission 2000, and transmits a signal which specifies the result of this detection to the ECU 8000.

The oil temperature sensor 8026 detects the temperature of the oil (ATF: Automatic Transmission Fluid) which is used for operation and lubrication of the automatic transmission 2000 (i.e. the oil temperature), and transmits a signal which specifies the result of this detection to the ECU 8000.

The ECU 8000 controls various devices so as to establish the desired running state of the vehicle, based upon the signals which are dispatched from the vehicle speed sensor 8002, the position switch 8006, the accelerator opening amount sensor 8010, the stroke sensor 8014, the throttle opening amount sensor 8018, the engine rotational speed sensor 8020, the input shaft rotational speed sensor 8022, the output shaft rotational speed sensor 8024, the oil temperature sensor 8026, and so on, and upon maps and programs which are stored in a ROM (Read Only Memory).

In this embodiment, when the shift range of this automatic transmission 2000 has been shifted to the D (drive) range by the shift lever 8004 being positioned to the D (drive) position, the ECU 8000 controls the automatic transmission 2000 so as to establish one or another of a first speed gear stage through a sixth speed gear stage. By establishing one of the first speed gear stage through the sixth speed gear stage, the automatic transmission 2000 is able to transmit drive force to the front wheels 7000. It should be understood that it would also be acceptable to arrange for it to be possible, in the D range, to establish one or more gear stages of higher speed than the sixth speed gear stage, in other words a seventh speed gear stage or an eighth speed gear stage. The gear stage which is established is determined in terms of the vehicle speed and the accelerator opening amount as parameters, based upon a speed change chart which is created in advance by experiment or the like.

Figure 2:
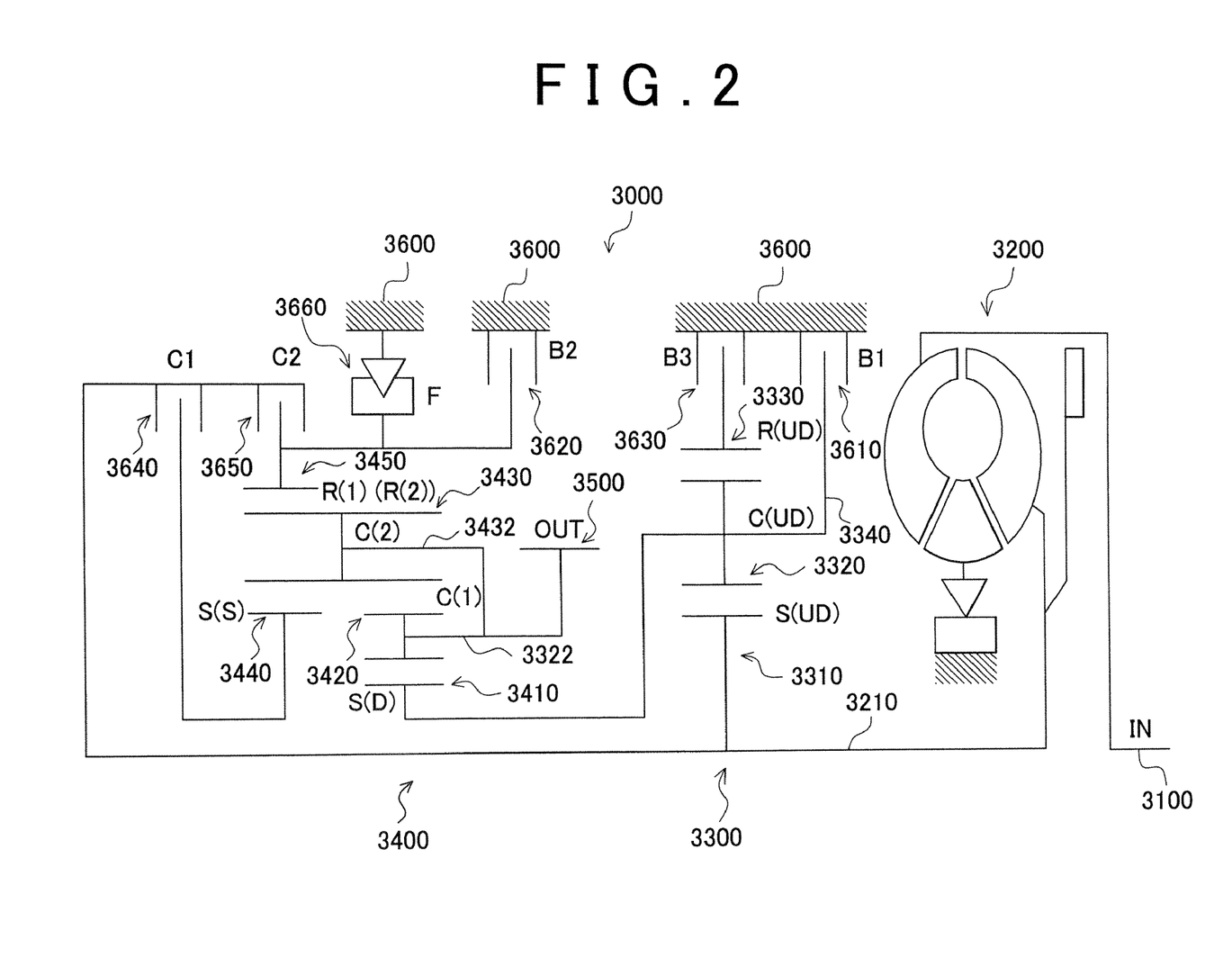
FIG. 2 is a skeleton diagram showing the gear train of this automatic transmission.

Referring to FIG. 2, the planetary gear unit 3000 will be explained. This planetary gear unit 3000 is connected to the torque converter 3200, which has an input shaft 3100 which is linked to the engine crank shaft. The planetary gear unit 3000 comprises a first set of planetary gear mechanism 3300, a second set of planetary gear mechanism 3400, an output gear 3500, brakes B13610, B2 3620, and B3 3630 which are fixed to the gear case 3600, a clutch C13640 and a clutch C2 3650, and a one way clutch F 3660.

The first planetary gear set 3300 is a single pinion type planetary gear mechanism. This first planetary gear set 3300 comprises a sun gear S (UD) 3310, a pinion gear 3320, a ring gear R (UD) 3330, and a carrier C (UD) 3340.

The sun gear S (UD) 3310 is linked to an output shaft 3210 of the torque converter 3200. And an pinion gear 3320 is freely rotatably supported upon the carrier C (UD) 3340. This pinion gear 3320 is meshed with the sun gear S (UD) 3310 and the ring gear R (UD) 3330.

The ring gear R (UD) 3330 is fixed to the gear case 3600 by the brake B3 3630. And the carrier C (UD) 3340 is fixed to the gear case 3600 by the brake B13610.

The second planetary gear set 3400 is a Ravingeau planetary gear mechanism. This second planetary gear set 3400 comprises a sun gear S (D) 3410, a short pinion gear 3420, a carrier C (1) 3422, a long pinion gear 3430, a carrier C (2) 3432, a sun gear S (S) 3440, and a ring gear R (1) (R (2)) 3450.

The sun gear S (D) 3401 is linked to the carrier C (UD) 3340. The short pinion gear 3420 is freely rotatably supported upon the carrier C (1) 3422. This short pinion gear 3420 is meshed with the sun gear S (D) 3410 and the long pinion gear 3430. The carrier C (1) 3422 is linked to the output gear 3500.

The long pinion gear 3430 is freely rotatably supported upon the carrier C (2) 3432. This long pinion gear 3430 is meshed with the short pinion gear 3420, the sun gear S (S) 3440, and the ring gear R (1) (R(2)) 3450. The carrier C (2) 3432 is linked to the output gear 3500.

The sun gear S (S) 3440 is linked to the output shaft 3210 of the torque converter 3200 by the clutch C13640. The ring gear R (1) (R(2)) 3450 is fixed to the gear case 3600 by the brake B2 3620, and is linked to the output shaft 3210 of the torque converter 3200 by the clutch C2 3650. Moreover, this ring gear R (1) (R(2)) 3450 is linked to the one way clutch F 3660, so that it cannot be rotated during driving in the first speed gear stage.

The one way clutch F 3660 is provided in parallel with the brake B2 3620. In other words, the outer race of this one way clutch F 3660 is fixed to the gear case 3600, while its inner race is linked to the ring gear R (1) (R(2)) 3450 via its rotation shaft.

Figure 3:
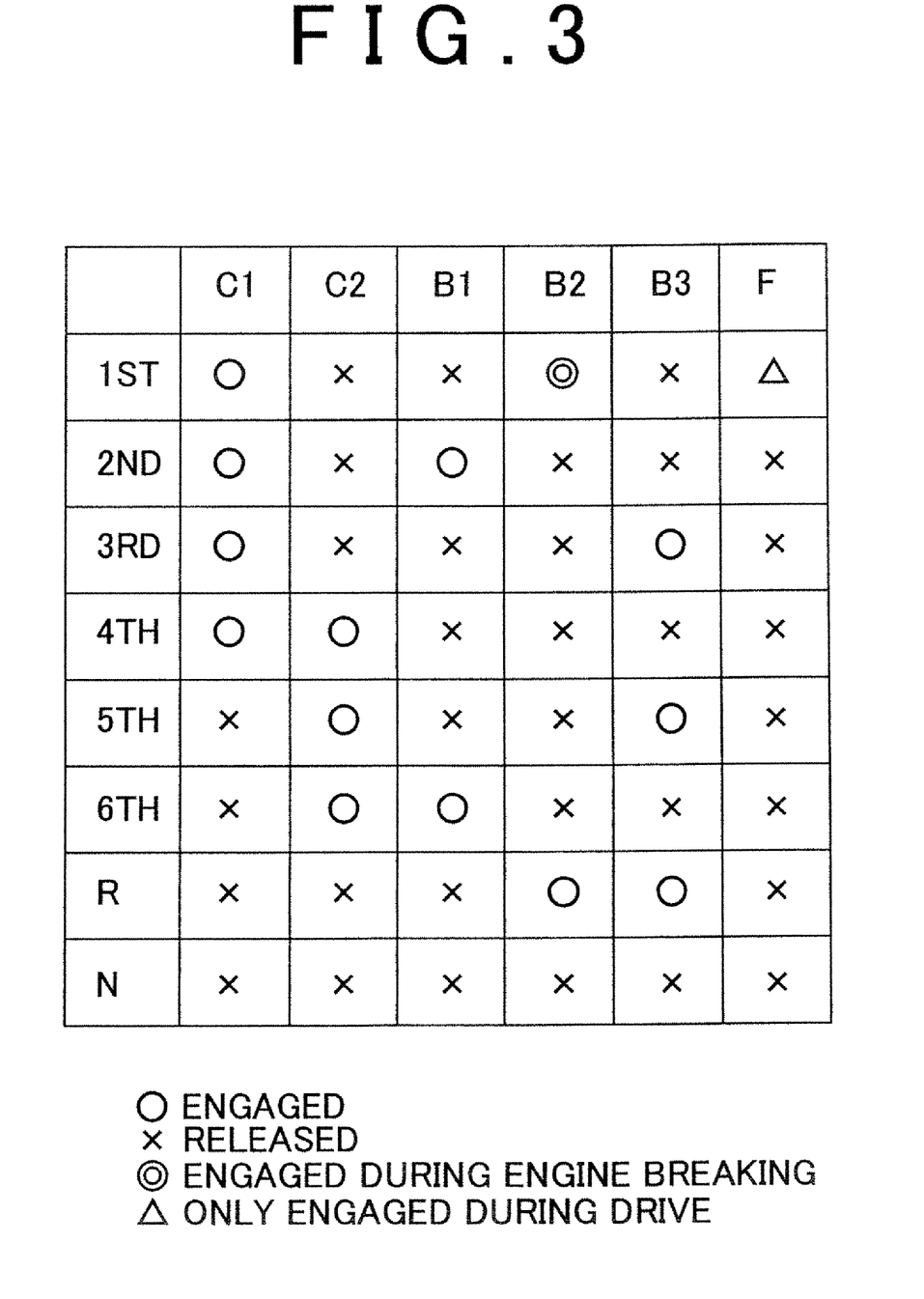
FIG. 3 is a figure showing an operating table of this automatic transmission.

In FIG. 3, there is shown an operating table which specifies the relationship between the various speed change gear stages, and the operational states of the various clutches and brakes. By operating the various clutches and brakes according to the combinations shown in this operating table, the various forward gear stages from the first speed range to the sixth gear speed range, and a reverse gear stage, can be engaged.

Figure 4:
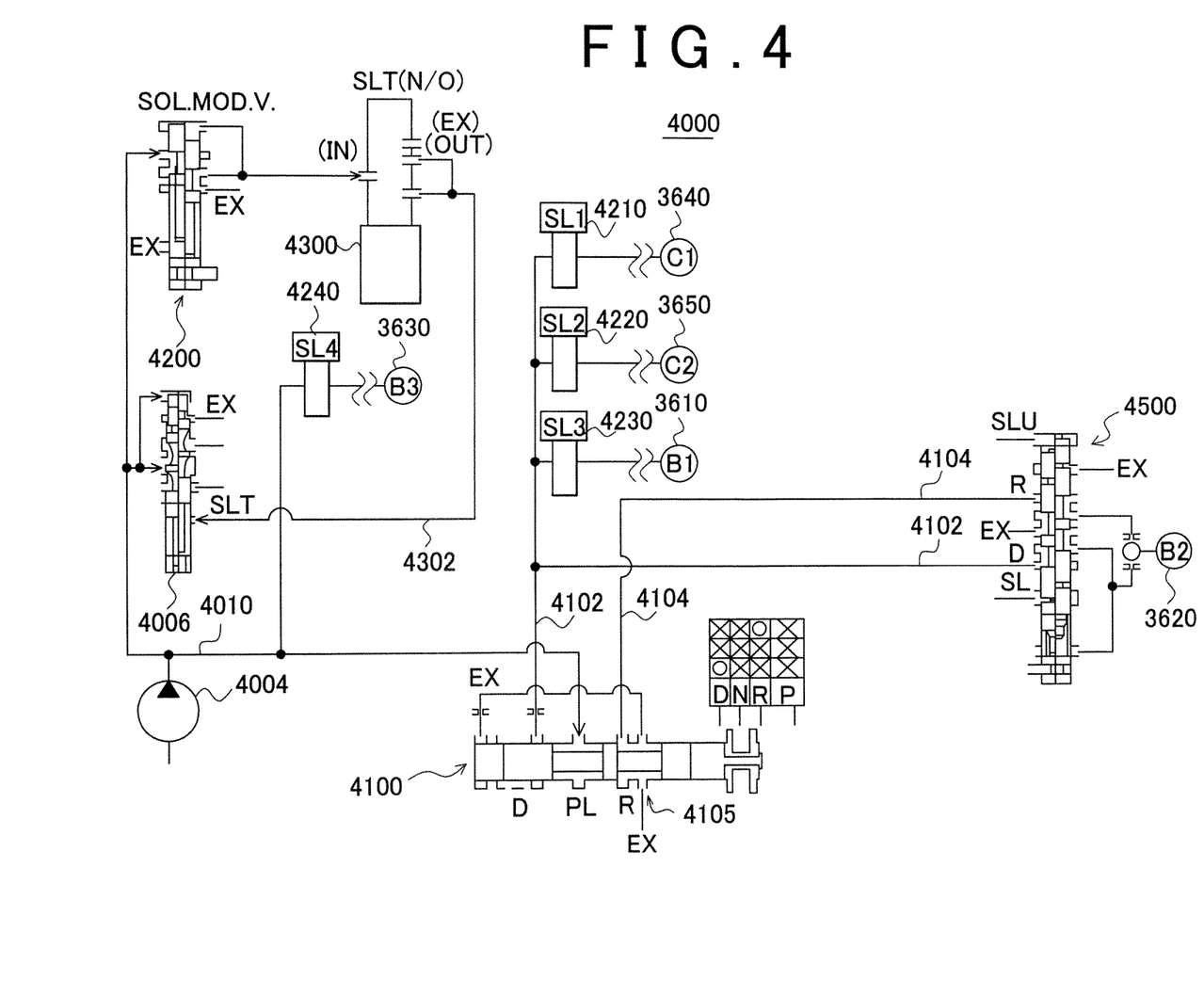
FIG. 4 is a figure showing essential portions of an oil pressure circuit of this automatic transmission.

Referring to FIG. 4, the essentials of the oil pressure circuit 4000 will now be explained. It should be understood that the oil pressure circuit 4000 is not limited to being the one described below.

The oil pressure circuit 4000 comprises an oil pump 4004, a primary regulator valve 4006, a manual valve 4100, a solenoid modulator valve 4200, a linear solenoid SL1 (hereinafter referred to as SL(1)) 4210, a linear solenoid SL2 (hereinafter referred to as SL(2)) 4220, a linear solenoid SL3 (hereinafter referred to as SL(3)) 4230, a linear solenoid SL4 (hereinafter referred to as SL(4)) 4240, a linear solenoid SLT (hereinafter referred to as SLT) 4300, and a control valve B2 4500.

The oil pump 4004 is linked to the crank shaft of the engine 1000. The oil pump 4004 is driven to generate oil pressure by the rotation of the crank shaft. The oil pressure generated by the oil pump 4004 is pressure regulated by the primary regulator valve 4006, so as to create a line pressure.

The primary regulator valve 4006 operates by taking a throttle pressure which has been pressure regulated by SLT 4300 as a pilot pressure. This line pressure is supplied to the manual valve 4100 via a line oil pressure conduit 4010.

The manual valve 4100 includes a drain port 4105. The oil pressures in a D range oil pressure conduit 4102 and a R range oil pressure conduit 4104 are discharged from this drain port 4105. When the spool of the manual valve 4100 is in the D position, the line oil pressure conduit 4010 and the D range oil pressure conduit 4102 are communicated together, so that oil pressure is supplied to the D range oil pressure conduit 4102.

At this time, the R range oil pressure conduit 4104 and a drain port 4105 are communicated together, so that the R range pressure in the R range oil pressure conduit 4104 is discharged from the drain port 4105.

On the other hand, when the spool of the manual valve 4100 is in the R position, the line oil pressure conduit 4010 and the R range oil pressure conduit 4104 are communicated together, so that oil pressure is supplied to the R range oil pressure conduit 4104. At this time, the D range oil pressure conduit 4102 and the drain port 4105 are communicated together, so that the D range pressure in the D range oil pressure conduit 4102 is discharged from the drain port 4105.

And, when the spool of the manual valve 4100 is in the N position, both the D range oil pressure conduit 4102 and the R range oil pressure conduit 4104 are communicated to the drain port 4105, so that both the D range pressure in the D range oil pressure conduit 4102 and the R range pressure in the R range oil pressure conduit 4104 are discharged from the drain port 4105.

The oil pressure which is supplied to the D range oil pressure conduit 4102 is finally supplied to the brake B1 3610, the brake B2 3620, the clutch C1 3640, and the clutch C2 3650. And the oil pressure which is supplied to the R range oil pressure conduit 4104 is finally supplied to the brake B2 3620.

The line pressure serves as a source pressure for the solenoid modulator valve 4200, which regulates the oil pressure supplied to the SLT 4300 (the solenoid modulator pressure) to a fixed pressure value.

The SL (1) 4210 pressure regulates the oil pressure which is supplied to the clutch C1 3640. The SL (2) 4220 pressure regulates the oil pressure which is supplied to the clutch C2 3650. The SL (3) 4230 pressure regulates the oil pressure which is supplied to the brake B1 3610. And the SL (4) 4240 pressure regulates the oil pressure which is supplied to the brake B3 3630.

The SLT 4300 pressure regulates the solenoid pressure according to a control signal from the ECU 8000 based upon the accelerator opening amount which is detected by the accelerator opening amount sensor 8010, to create a throttle pressure. This throttle pressure is supplied via a SLT oil conduit 4302 to the primary regulator valve 4006. And the throttle pressure is utilized as a pilot pressure for the primary regulator valve 4006.

The SL (1) 4210, the SL (2) 4220, the SL (3) 4230, the SL (4) 4240, and the SLT 4300 are controlled by control signals which are transmitted from the ECU 8000.

The control valve B2 4500 is selectively supplied with oil pressure from either the D range oil pressure conduit 4102 or the R range oil pressure conduit 4104, and supplies this pressure to the brake B2 3620. And this control valve B2 4500 is connected to the D range oil pressure conduit 4102 and to the R range oil pressure conduit 4104. The control valve B2 4500 is controlled by oil pressures supplied from an SL solenoid valve (not shown in the figure) and from an SLU solenoid valve (also not shown in the figure), and by the biasing force of a spring.

When the SLU solenoid valve is ON with the SL solenoid valve OFF, then the control valve B2 4500 is in its state shown on the left side of its axis in FIG. 4. In this case, the oil pressure which is supplied from the SLU solenoid valve is used in this control valve B2 4500 as a pilot pressure, and the D range oil pressure is supplied to the brake B2 3620 after having been pressure regulated.

On the other hand when the SLU solenoid valve is OFF with the SL solenoid valve ON, then the control valve B2 4500 is in its state shown on the right side of its axis in FIG. 4. In this case, the R range oil pressure is supplied to the brake B2 3620.

Figure 5:
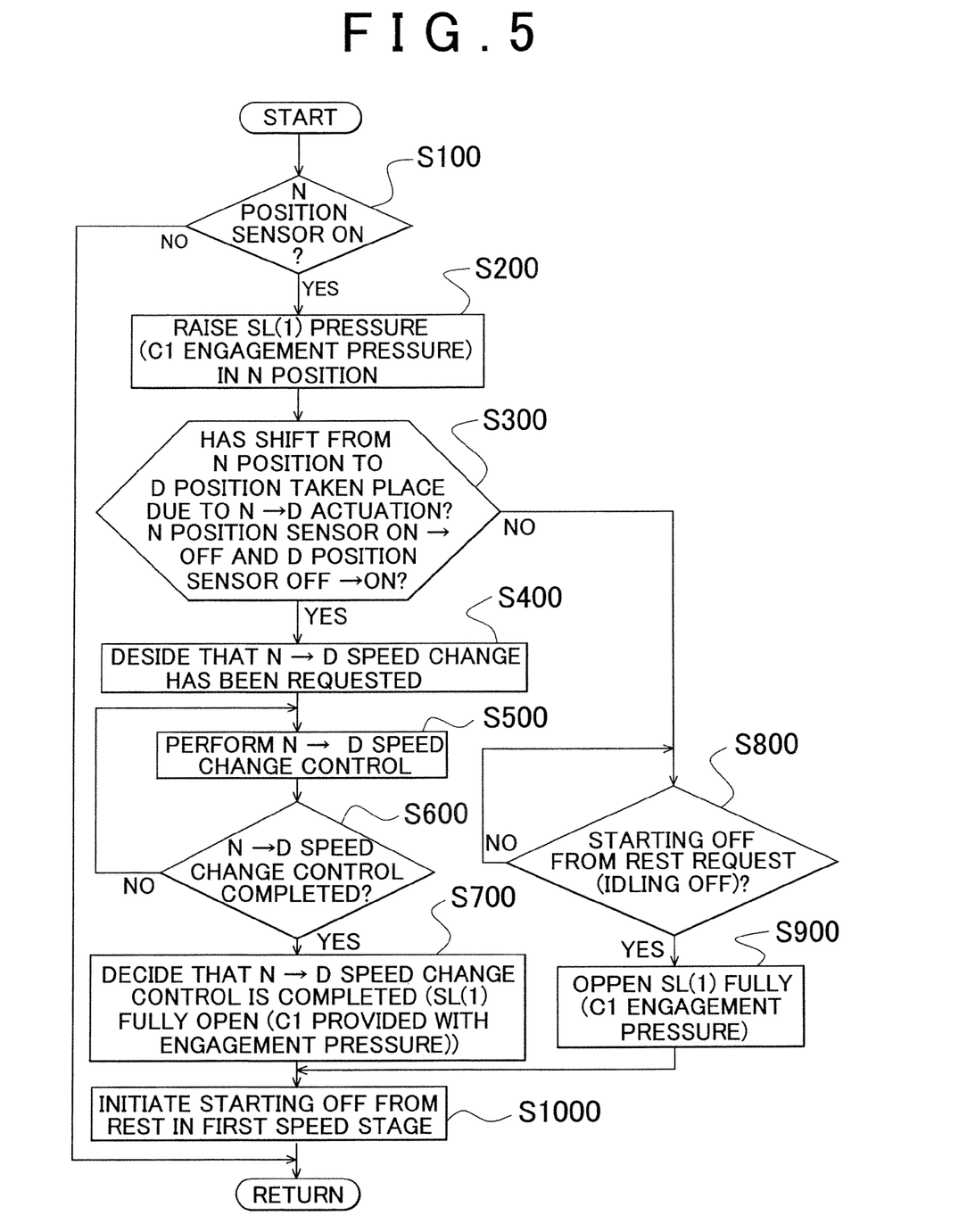
FIG. 5 is a flow chart showing the structure of a control program executed by this ECU which is a control device according to an embodiment of the present invention.

Now, referring to FIG. 5, the structure of a control program which is executed by the ECU 8000, which is the control device according to this embodiment of the present invention, will be explained. It should be understood that this program is, for example, executed by the ECU 8000 in the case of a failure in which, although the shift lever is in the D position, the position switch 8006 does not detect the D position, or in the case of a failure in which, although the shift lever is in the D position, the position switch 8006 continues to detect the N position.

In a step S100 (hereinafter "step" will be abbreviated as "S"), the ECU 8000 decides whether or not the N position sensor of the position switch 8006 is ON. It should be understood that, at this time, it is supposed that the shift lever 8004 is in the N position. If the N position sensor of the position switch 8006 is ON (YES in the step S100), then the flow of control proceeds to a step S200. However, if this is not the case (NO in the step S100), then this process terminates.

In the step S200, even in the N position, the ECU 8000 increases the opening amount of SL (1) 4210 (i.e. supplies oil pressure to the clutch C1 3640). It should be understood that SL (1) 4210 is a linear solenoid valve for engaging the clutch C1 3640 in order to ensure that it is definitely changed over from its released state to its engaged state when the vehicle is starting off from rest.

In the next step S300, the ECU 8000 makes a decision, according to signals inputted to the ECU 8000 from the position switch 8006, which is actuated by the shift lever 8004 being shifted from the N position to the D position, as to whether or not a transition has occurred from the N position to the D position. In more concrete terms, if the signal from the N position sensor goes from the ON state to the OFF state, and moreover the signal from the D position sensor goes from the OFF state to the ON state, then it is decided that a transition has occurred from the N position to the D position. If it has been decided that a transition has occurred from the N position to the D position (YES in the step S300), then the flow of control proceeds to the next step S400. However, if this is not the case (NO in the step S300), then the flow of control is transferred to the step S800.

In the step S400, the ECU 8000 decides that a speed change from the N position to the D position has been requested. In other words, it decides that the friction engagement elements should be changed over from the state shown under "N" in FIG. 3 to the state shown by "1ST" in that figure.

In the next step S500, the ECU 8000 controls the oil pressure circuit 4000 (i.e. transmits a duty signal to the linear solenoid valve), and performs control for speed change from the N position to the D position (1ST).

In the next step S600, a decision is made as to whether or not the speed change from the N position to the D position has been completed. If, for example, the turbine rotational speed has arrived at the rotational speed for synchronizing the first speed range (1ST), then it is decided that the speed change from the N position to the D position has been completed. If it is decided that the speed change from the N position to the D position has been completed (YES in the step S600), then the flow of control proceeds to the next step S700. However, if this is not the case (NO in the step S600), then the flow of control returns to the step S500.

In the step S700, the ECU 8000 decides that control for changing the speed from the N position to the D position has been completed. It should be understood that, at this time, SL (1) 4210 is in the fully opened state for driving the clutch C13640 which is engaged, since the first speed range (1ST) is engaged.

On the other hand, in the step S800 the ECU 8000 decides whether or not a request for the vehicle to start off from rest has been made by the accelerator pedal 8008 being actuated or the like. The opening amount of the accelerator pedal 8008 is detected by the accelerator opening amount sensor 8010, which inputs a signal specifying this opening amount of the accelerator pedal 8008 to the ECU 8000. If a request has been issued for the vehicle to start off from rest, for example by the driver actuating the accelerator pedal 8008 or the like (YES in the step S800), then the flow of control proceeds to the step S900. However, if this is not the case (NO in the step S800), then the flow of control loops back to this step S800 again. It should be understood that this decision as to whether the idling state has been terminated is because normally the engine 1000 transits from the idling state to the non-idling state when the accelerator pedal 8008 is actuated (i.e. when the driver requests for the vehicle to start off from rest). Due to this, when the result in the step S800 is NO, the engine 1000 is in the idling state.

In the step S900, the ECU 8000 transmits a duty signal to the linear solenoid valve SL (1) 4210, so as to put SL (1) 4210 in the fully opened state, thus driving (supplying engagement pressure to) the clutch C13640 in order to engage the first speed range (1ST).

In the step S1000, the ECU 8000 starts control to shift off from rest in the first speed range. When the driver releases the brake pedal 8012 (it is supposed that he has been depressing the brake pedal 8012 in order to suppress the creep force after first speed is engaged) and depresses the accelerator pedal 8008, then the vehicle moves away from rest.

The operation based upon the structure and the flow chart described above for speed change control performed by the ECU 8000, which is the control device according to this embodiment of the present invention, will now be explained with reference to FIGS. 6 and 7. It should be understood that FIG. 6 shows the case of the present invention, while FIG. 7 relates to the case of the related art.

Figure 6:
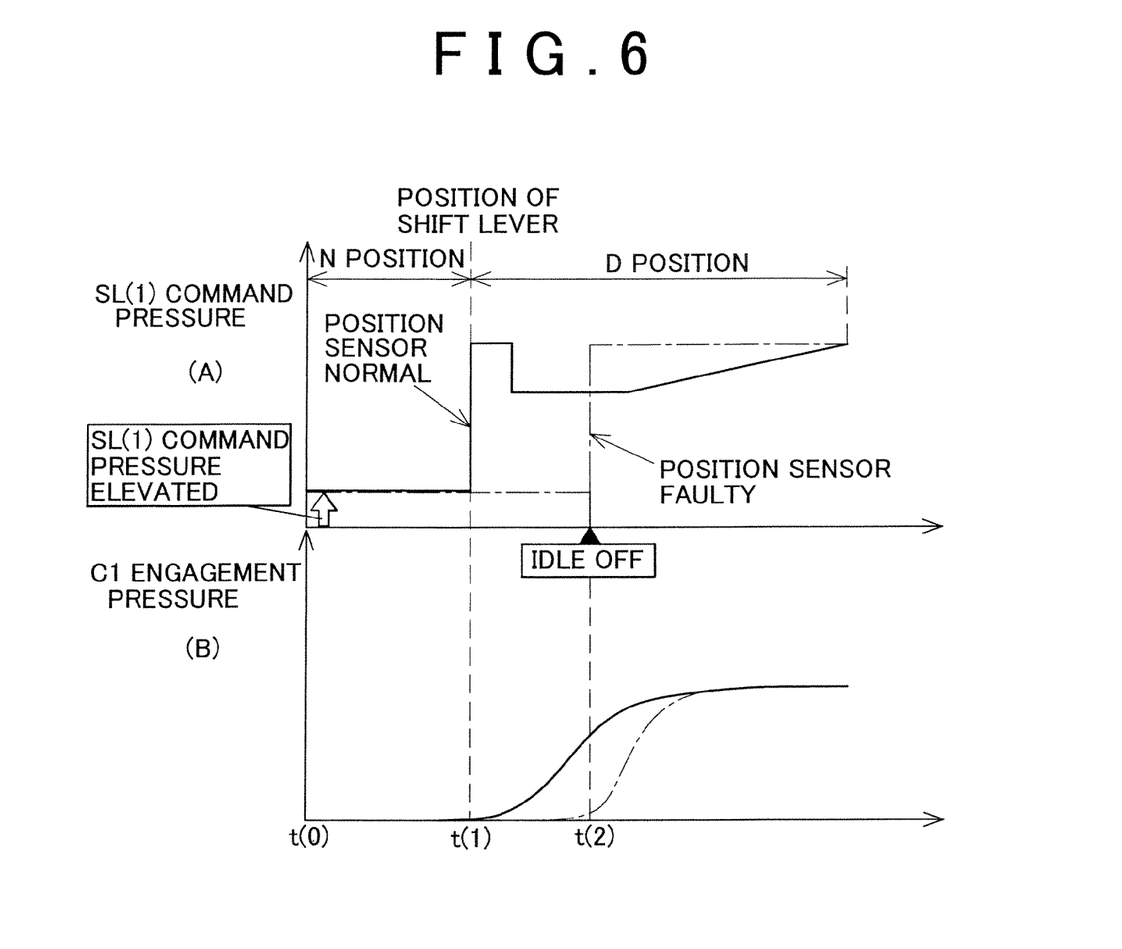
FIG. 6 is a timing chart during garage shifting according to the method of the present invention.

When the shift lever 8004 is in the N position and the N position sensor is ON (YES in the step S100), then, as shown at the time instant t in FIG. 6A, the command pressure of SL (1) 4210 is elevated to a pressure which is determined in advance. At this time, a command pressure sufficient to cause the vehicle to move forward is not provided. In other words, the command pressure is not sufficiently large to correspond to an engagement pressure great enough to put the clutch C13640 into its power transmission state.

When the position sensors are operating normally: When the shift lever 8004 is in the N position and the N position sensor is ON (YES in the step S100), the command pressure for the SL (1) 4210 is elevated even in this N position (the time instant t(0) in FIG. 6A).

When the shift lever 8004 is operated from the N position to the D position, the N position sensor goes from the ON state to the OFF state, and the D position sensor goes from the OFF state to the ON state (YES in the step S300), then speed change control from the N position to the D position (i.e. first speed (1ST)) is performed from the time instant t of FIG. 6A. At this time, in order to make the responsiveness of the command pressure of SL (1) 4210 good, and in order to engage the clutch C13640 rapidly (in particular when, at low temperature, the viscosity of the working oil is high and the responsiveness of the oil pressure is bad), directly after the command, an oil pressure command value which becomes greater in steps is outputted from the ECU 8000. By performing control in this manner, the engagement pressure of the clutch C13640 is elevated rapidly as shown in FIG. 6B, and, due to the actual engagement pressure of this clutch C13640 being elevated, the turbine rotational speed NT drops, and is able rapidly to arrive at the rotational speed for first speed range synchronization, so that the vehicle starts away from rest.

When the position sensors are operating anomalously: Irrespective of the state (normal or anomalous) of the position switch 8006, when the shift lever 8004 is in its N position and the N position sensor is ON (YES in the step S100), in other word in the N position, the command pressure of SL (1) 4210 is elevated (at the time instant t(0) in FIG. 6A).

When an anomaly of the position switch 8006 is occurring in which, even though the shift lever 8004 is actuated from its N position to its D position, the N position sensor remains in its ON state and the D position sensor remains in its OFF state (NO in the step S300), from the time instant t(1) in FIG. 6A, speed change control from the N position to the D position (first speed (1ST)) is not performed. Due to this, the engagement pressure of the clutch C13640 is also not elevated. As shown in FIG. 6A, when the driver (this driver has requested the vehicle to start the vehicle away from rest by shifting the shift lever 8004 to the D position) depresses the accelerator pedal 8008 so that a request for the vehicle to shift away from rest is detected (YES in the step S800), then, as shown in FIG. 6A, the command pressure of SL (1) 4210, which has been elevated in advance, is brought to the fully opened state in steps. This is at the time instant t(2) shown in FIG. 6A. For example, even if at low temperature the responsiveness of the working oil is bad, subsequently to the time instant t(2), the engagement pressure of the clutch C13640 can be rapidly elevated as shown in FIG. 6B, since the command pressure of SL (1) 4210 is elevated in the state of the N position in advance.

Figure 7:
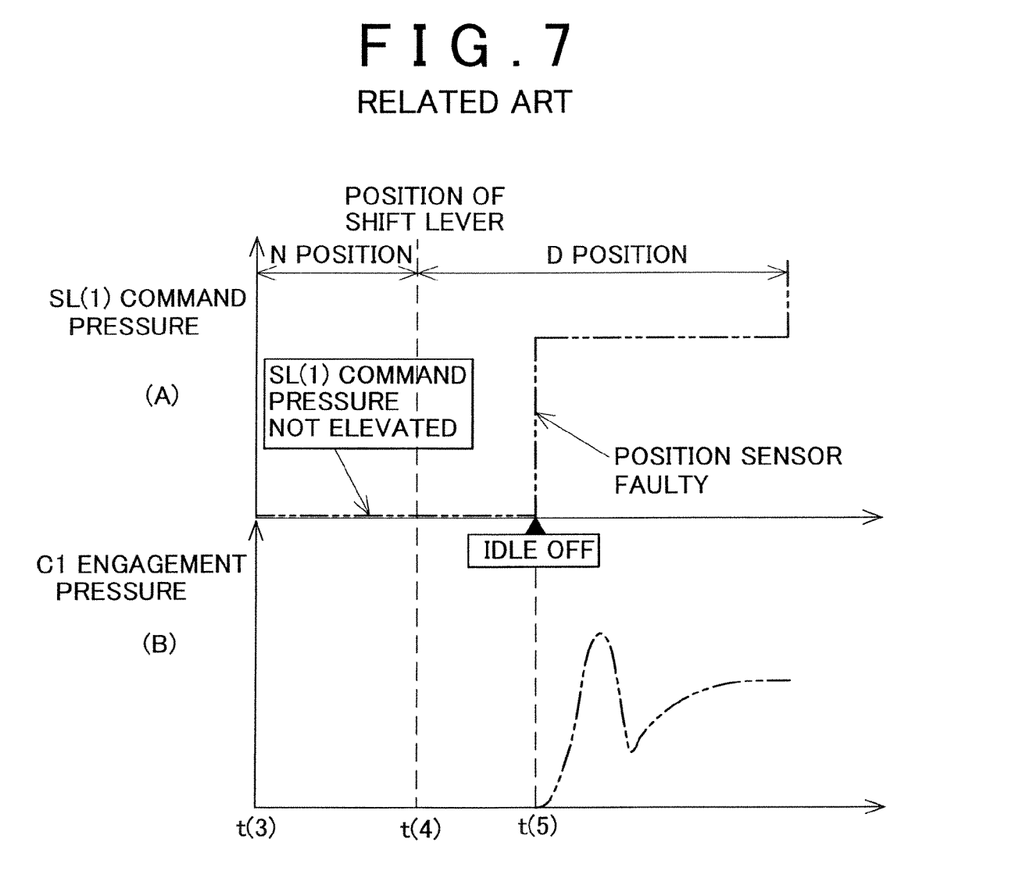
FIG. 7 is a timing chart during garage shifting according to a related art method.

On the other hand, in the method according to the related art shown in FIG. 7, irrespective of the state of the position switch 8006 (normal or anomalous), even when the shift lever 8004 is at its N position and the N position sensor is ON (YES in the step S100), the command pressure of SL (1) 4210 is not elevated (at the time instant t(3) in FIG. 7A).

As shown in FIG. 7A, when the driver (this driver has requested the vehicle to start the vehicle away from rest by shifting the shift lever 8004 to the D position) depresses the accelerator pedal 8008 so that a request for the vehicle to shift away from rest is detected (YES in the step S800), then, as shown in FIG. 7A, the command pressure of SL (1) 4210 is brought from the fully closed state to the fully opened state. This is at the time instant t(5) shown in FIG. 7A. In particular if, at low temperature, the responsiveness of the working oil is bad, then, subsequently to the time instant t(5), the engagement pressure of the clutch C1 3640 is not stable, as shown in FIG. 7B, since the command pressure of SL (1) 4210 is not elevated in the state of the N position in advance; and accordingly the engagement pressure of the clutch C1 3640 can exceed the commanded pressure, or the clutch may go into a state such as hunting, and control may become difficult.

It should be understood that, by continuing to elevate the command pressure of SL (1) 4210 from 0% duty (it is supposed that this corresponds to fully closed) to 100% (it is supposed that this corresponds to fully open) straight away in this manner, the driver may also feel a sense of discomfort, and may also become aware that the vehicle is malfunctioning.

By doing as described above, according to the ECU which is the control device according to this embodiment of the present invention, supposing that there is a fault in a position sensor so that the fact that the shift position has been changed over from the N position which is a non-running position, to the D position which is a running position, cannot be detected, then, even in this state of a non-running position, the command pressure of the linear solenoid valve is elevated, as will become necessary when engaging the D position. Due to this, even if for example at low temperature the responsiveness of the working oil is bad, it is still possible to ensure a satisfactory characteristic for starting the vehicle away from rest.

It should be understood that, in the processing of the step S900, the ECU 8000 sets the command pressure of the SL (1) 4210 to fully open at the time instant t(3) in FIG. 7, but it would also be acceptable to arrange for the command pressure of the SL (1) 4210 to be set to fully open when the rotational speed of the output shaft, as detected by the output shaft rotational speed sensor 8024, has reached the running state.

Moreover, it would also be acceptable to arrange for the processing of the step S200 to be performed if the temperature of the working oil of this automatic transmission 2000 is less than some threshold predetermined temperature.

In the embodiments disclosed above, all of the various features should be considered as given by way of example, and not as being limitative. The range of the present invention is not limited by the above explanation, and is specified only by the range of the Patent Claims; all changes which have the same meaning as the range of the Patent Claims and which are within their scope are intended to be included.

What is claimed is:

1. A control device for an automatic transmission which transitions from a non-running state to a running state by a friction engaging element which is operated by oil pressure which transitions from a released state to an engaged state, comprising:
    a shift position detection unit which detects shift positions, including a first shift position which corresponds to the non-running state and a second shift position which corresponds to the running state, based upon a position of a shift actuation mechanism;
    an oil pressure control unit which raises the oil pressure supplied to the friction engaging element to an elevated state, when the shift position detection unit detects that the shift position is the first shift position;
    a running request detection unit which detects a running request irrespective of the position of the shift actuation mechanism; and
    a starting control unit which further raises the oil pressure supplied to the friction engaging element to a power transmission state, if the running request is detected,
    wherein the running request detection unit detects the running request if, irrespective of whether or not the position of the shift actuation mechanism is a position which corresponds to the second shift position, the shift position detection unit detects that the position of the shift actuation mechanism is the first shift position.

2. A control device for an automatic transmission which transitions from a non-running state to a running state by a friction engaging element which is operated by oil pressure which transitions from a released state to an engaged state, comprising:
    a shift position detection unit which detects shift positions, including a first shift position which corresponds to the non-running state and a second shift position which corresponds to the running state, based upon the position of a shift actuation mechanism;
    an oil pressure control unit which raises the oil pressure supplied to the friction engaging element, when the shift position detection unit detects that the shift position is the first shift position;
    a running request detection unit which detects a running request if, irrespective of whether or not the position of the shift actuation mechanism is a position which corresponds to the second shift position, the shift position detection unit cannot detect that the position of the shift actuation mechanism is the second shift position; and
    a starting control unit which, if a running request is detected, raises the oil pressure supplied to the friction engaging element until the friction engaging element is brought to a power transmission state.

3. A control device for an automatic transmission according to claim 2, further comprising:
    an output shaft rotational speed detection unit which detects the output shaft rotational speed of the automatic transmission; and
    an oil pressure control unit which raises the oil pressure supplied to the friction engaging element to a maximum amount, if the running request is detected, and if based upon the output shaft rotational speed it is decided that the vehicle is running.

4. A control device for an automatic transmission according to claim 3, further comprising:
    a working oil temperature detection unit which detects the temperature of the working oil of the automatic transmission; and wherein the oil pressure control unit raises the oil pressure supplied to the friction engaging element, if the temperature of the working oil is lower than a predetermined temperature.

5. A control method for an automatic transmission which transitions from a non-running state to a running state by a friction engaging element which is operated by oil pressure which transitions from a released state an engaged state, comprising:
    detecting shift positions, including a first shift position which corresponds to the non-running state and a second shift position which corresponds to the running state, based upon a position of a shift actuation mechanism;
    raising the oil pressure supplied to the friction engaging element to an elevated state, when the detecting shift positions detects the first shift position;
    detecting a running request irrespective of the position of the shift actuation mechanism; and
    raising the oil pressure supplied to the friction engaging element further to a power transmission state, if the running request is detected,
    wherein the running request is detected if, irrespective of whether or not the position of the shift actuation mechanism is a position which corresponds to the second shift position, it is not possible to detect that the position of the shift actuation mechanism is the second shift position.

6. A control method for an automatic transmission which transitions from a non-running state to a running state by a friction engaging element which is operated by oil pressure which transitions from a released state an engaged state, comprising:
    detecting shift positions, including a first shift position which corresponds to the non-running state and a second shift position which corresponds to the running state, based upon a position of a shift actuation mechanism;
    raising the oil pressure supplied to the friction engaging element to an elevated state, when the detecting shift positions detects the first shift position;

detecting a running request irrespective of the position of the shift actuation mechanism; and raising the oil pressure supplied to the friction engaging element further to a power transmission state, if the running request is detected, wherein the running request is detected if, irrespective of whether or not the position of the shift actuation mechanism is a position which corresponds to the second shift position, it is detected that the position of the shift actuation mechanism is the first shift position.

7. A control method for an automatic transmission according to claim 5, further comprising:

detecting the output shaft rotational speed of the automatic transmission; and raising the oil pressure supplied to the friction engaging element to a maximum amount, if the running request is detected, and if based upon the output shaft rotational speed it is decided that the vehicle is running.

8. A control method for an automatic transmission according to claim 7, further comprising:

detecting the temperature of the working oil of the automatic transmission; and raising the oil pressure supplied to the friction engaging element, if the temperature of the working oil which is detected is lower than a predetermined temperature.

9. A control device for an automatic transmission according to claim 1, wherein the running request is detected if an opening amount of an accelerator pedal is greater than a predetermined amount.

10. A control device for an automatic transmission according to claim 1, further comprising:

an output shaft rotational speed detection unit which detects the output shaft rotational speed of the automatic transmission; and an oil pressure control unit which raises the oil pressure supplied to the friction engaging element to a maximum amount, if the running request is detected, and if based upon the output shaft rotational speed it is decided that the vehicle is running.

11. A control device for an automatic transmission according to claim 10, further comprising a working oil temperature detection unit which detects the temperature of the working oil of the automatic transmission; and wherein the oil pressure control unit raises the oil pressure supplied to the friction engaging element, if the temperature of the working oil is lower than a predetermined temperature.

12. A control device for an automatic transmission according to claim 2, wherein the running request is detected if an opening amount of an accelerator pedal is greater than a predetermined amount.

13. A control device for an automatic transmission according to claim 5, wherein the running request is detected if an opening amount of an accelerator pedal is greater than a predetermined amount.

14. A control method for an automatic transmission according to claim 6, further comprising:

detecting the output shaft rotational speed of the automatic transmission; and raising the oil pressure supplied to the friction engaging element to a maximum amount, if the running request is detected, and if based upon the output shaft rotational speed it is decided that the vehicle is running.

15. A control method for an automatic transmission according to claim 14, further comprising:

detecting the temperature of the working oil of the automatic transmission; and raising the oil pressure supplied to the friction engaging element, if the temperature of the working oil which is detected is lower than a predetermined temperature.

* * * * *